US008140525B2

(12) United States Patent
Iwasaki

(10) Patent No.: US 8,140,525 B2
(45) Date of Patent: Mar. 20, 2012

(54) INFORMATION PROCESSING APPARATUS, INFORMATION PROCESSING METHOD AND COMPUTER READABLE INFORMATION RECORDING MEDIUM

(75) Inventor: Masajiro Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 425 days.

(21) Appl. No.: 12/216,685

(22) Filed: Jul. 9, 2008

(65) Prior Publication Data
US 2009/0030900 A1    Jan. 29, 2009

(30) Foreign Application Priority Data

Jul. 12, 2007  (JP) .................................. 2007-182990
Jul. 1, 2008   (JP) .................................. 2008-172811

(51) Int. Cl.
G06F 7/00 (2006.01)
G06F 17/30 (2006.01)
(52) U.S. Cl. ......... 707/723; 707/741; 707/748; 707/805
(58) Field of Classification Search .................. 707/711, 707/723, 741, 748, 805
See application file for complete search history.

(56) References Cited

U.S. PATENT DOCUMENTS

| 6,169,998 | B1 |   | 1/2001  | Iwasaki et al. |
| 6,185,558 | B1 | * | 2/2001  | Bowman et al. ............... 705/37 |
| 6,233,586 | B1 | * | 5/2001  | Chang et al. ............ 707/999.01 |
| 6,321,228 | B1 | * | 11/2001 | Crandall et al. ....... 707/999.002 |
| 6,356,286 | B1 |   | 3/2002  | Lawrence |
| 6,665,655 | B1 | * | 12/2003 | Warner et al. .......... 707/999.003 |
| 7,082,428 | B1 | * | 7/2006  | Denny et al. ........... 707/999.004 |
| 7,451,142 | B2 | * | 11/2008 | Arellanes et al. ...... 707/999.005 |
| 2002/0046209 | A1 | * | 4/2002  | De Bellis ........................ 707/10 |
| 2005/0289100 | A1 | * | 12/2005 | Dettinger et al. ................. 707/1 |
| 2006/0242681 | A1 | * | 10/2006 | Brain et al. .................... 725/109 |
| 2007/0043718 | A1 | * | 2/2007  | Arellanes et al. ................. 707/5 |
| 2007/0065045 | A1 |   | 3/2007  | Iwasaki |
| 2007/0112758 | A1 | * | 5/2007  | Livaditis ........................... 707/5 |
| 2007/0124194 | A1 | * | 5/2007  | Barnette et al. ................. 705/10 |
| 2007/0171473 | A1 |   | 7/2007  | Iwasaki |
| 2007/0171482 | A1 |   | 7/2007  | Iwasaki |
| 2007/0225968 | A1 | * | 9/2007  | Murakami et al. ................. 704/9 |

(Continued)

FOREIGN PATENT DOCUMENTS

CN    1299488    6/2001

(Continued)

OTHER PUBLICATIONS

European Search Report dated Sep. 11, 2008 for counterpart European Application No. 08160189.0.

(Continued)

Primary Examiner — Phong Nguyen
(74) Attorney, Agent, or Firm — Harness, Dickey & Pierce, PLC

(57) ABSTRACT

An information processing apparatus uses a storing unit configured to store search conditions, search results obtained based the search conditions and importance levels of the search results in association with each other. When an input search condition has been stored in the storing unit, a search result and an importance level from the storing unit with the use of the search condition as a key, and, when the input search condition has not been stored in the storing unit, a new search result based on the input search condition. On a display screen, the search results modified according to the importance levels, or the new search results, are displayed.

6 Claims, 10 Drawing Sheets

U.S. PATENT DOCUMENTS

2008/0147635 A1* 6/2008 Im ..................................... 707/5

FOREIGN PATENT DOCUMENTS

| JP | 2001-109752 | 4/2001 |
| JP | 3671368 | 4/2005 |
| WO | WO 99/48028 | 9/1999 |

OTHER PUBLICATIONS

"Chapter 1 Introduction to DIALOG", (XP002930328), pp. 1-06, Aug. 1, 1987.

Chinese Office Action dated Jan. 29, 2010 for counterpart Chinese Application No. 2008101280413.

English language abstract of JP 2002-351916 dated Dec. 6, 2002.

* cited by examiner

FIG.2A

| SEARCH ID | SEARCH CONDITION |
|---|---|
| 1 | XX COMPANY |
| 2 | CAMERA |
| 3 | XX COMPANY & CAMERA |
| 4 | XX COMPANY &MFP |
| 5 | MFP & COPY |
| ⋮ | ⋮ |

FIG.2B

| SEARCH ID | SEARCH RESULT |
|---|---|
| 1 | FILE 1 |
| 2 | FILE 2 |
| ⋮ | ⋮ |

FIG.2C

| CONDITION ID | DATA TYPE | RESULT ID |
|---|---|---|
| 1 | IMPORTANT | 1 |
| 1 | IMPORTANT | 2 |
| 1 | IMPORTANT | 3 |
| 1 | IMPORTANT | 4 |
| 1 | IMPORTANT | 5 |
| 1 | IMPORTANT | 6 |
| 1 | IMPORTANT | 7 |
| 1 | IMPORTANT | 8 |
| 2 | IMPORTANT | 2 |
| 2 | IMPORTANT | 5 |
| 2 | IMPORTANT | 6 |
| 2 | IMPORTANT | 9 |
| 2 | IMPORTANT | 10 |
| 2 | IMPORTANT | 11 |
| 3 | IMPORTANT | 2 |
| 3 | IMPORTANT | 5 |
| 3 | IMPORTANT | 6 |
| 4 | IMPORTANT | 4 |
| 4 | IMPORTANT | 6 |
| 4 | IMPORTANT | 7 |
| 4 | IMPORTANT | 8 |
| 5 | IMPORTANT | 6 |
| 5 | IMPORTANT | 8 |
| 5 | IMPORTANT | 12 |
| 5 | IMPORTANT | 13 |
| 5 | IMPORTANT | 14 |
| 5 | IMPORTANT | 15 |
| ⋮ | ⋮ | ⋮ |

INFORMATION PROCESSING APPARATUS, INFORMATION PROCESSING METHOD AND COMPUTER READABLE INFORMATION RECORDING MEDIUM

BACKGROUND OF THE INVENTION

1. Field of the Invention

The present invention relates to information processing apparatus, information processing method, a program and a computer readable information recording medium.

2. Description of the Related Art

In the related art, a search result is stored, and is read thereafter. For example, in a case of Web search, a search result can be managed as a bookmark of Web. Further, search results may be organized as information stored in a database.

For example, Japanese Laid-Open Patent Application 2001-109752 discloses a system in which search results are stored and past search results are utilized for effectively carrying out search. Japanese Patent No. 3671368 discloses an apparatus in which search results which a user considers important are stored as bookmarks, search is then carried out on the bookmarks, and thus, effective search results may be obtained therefrom.

SUMMARY OF THE INVENTION

Information unique to a user is included in a search result. Therefore, an object of the present invention is to provide an apparatus, a method, a program and a computer readable information recording medium, for which, with the use of such information unique to a user, information suitable to the user may be efficiently provided to the user.

In the invention, a storing unit is used which is configured to store search results obtained based search conditions and importance levels of the search results in association with each other. When a given search condition has been stored in the storing unit, a search result and an importance level corresponding thereto are obtained from the storing unit with the use of the given search condition as a key, and, when the given search condition has not been stored in the storing unit, a new search result is obtained based on the given search condition. The search results modified according to the importance levels, or the new search results are displayed.

In the invention, it is possible to efficiently provide information suitable to a user.

Other objects, features and advantages of the present invention will become more apparent from the following detailed description when read in conjunction with the accompanying drawings.

BRIEF DESCRIPTION OF THE DRAWINGS

FIG. 2A shows a data structure of a search condition table;

FIG. 2B shows a data structure of a search result table;

FIG. 2C shows a data structure of an importance level table;

DESCRIPTION OF REFERENCE NUMERALS

10 INFORMATION PROCESSING APPARATUS
20 SEARCH SYSTEM
51 CPU
52 ROM
53 RAM
57 COMMUNICATION I/F
62 BUS
100 SEARCH CONDITION OBTAINING PART
102 SEARCH CONDITION DISPLAY PART
104 SEARCH PART
106 SEARCH RESULT DB
108 SEARCH RESULT DISPLAY PART
110 DESIGNATION RECEIVING PART
112 IMPORTANCE LEVEL DETERMINING PART
114 RANKING PART
116 SEARCH CONDITION CLASSIFYING PART
300 INPUT PAGE
302 SEARCH RESULT LIST PAGE
304 DOCUMENT FILE PAGE
310 SEARCH CONDITION LIST PAGE

DETAILED DESCRIPTION OF THE PREFERRED EMBODIMENTS

Figure 1:
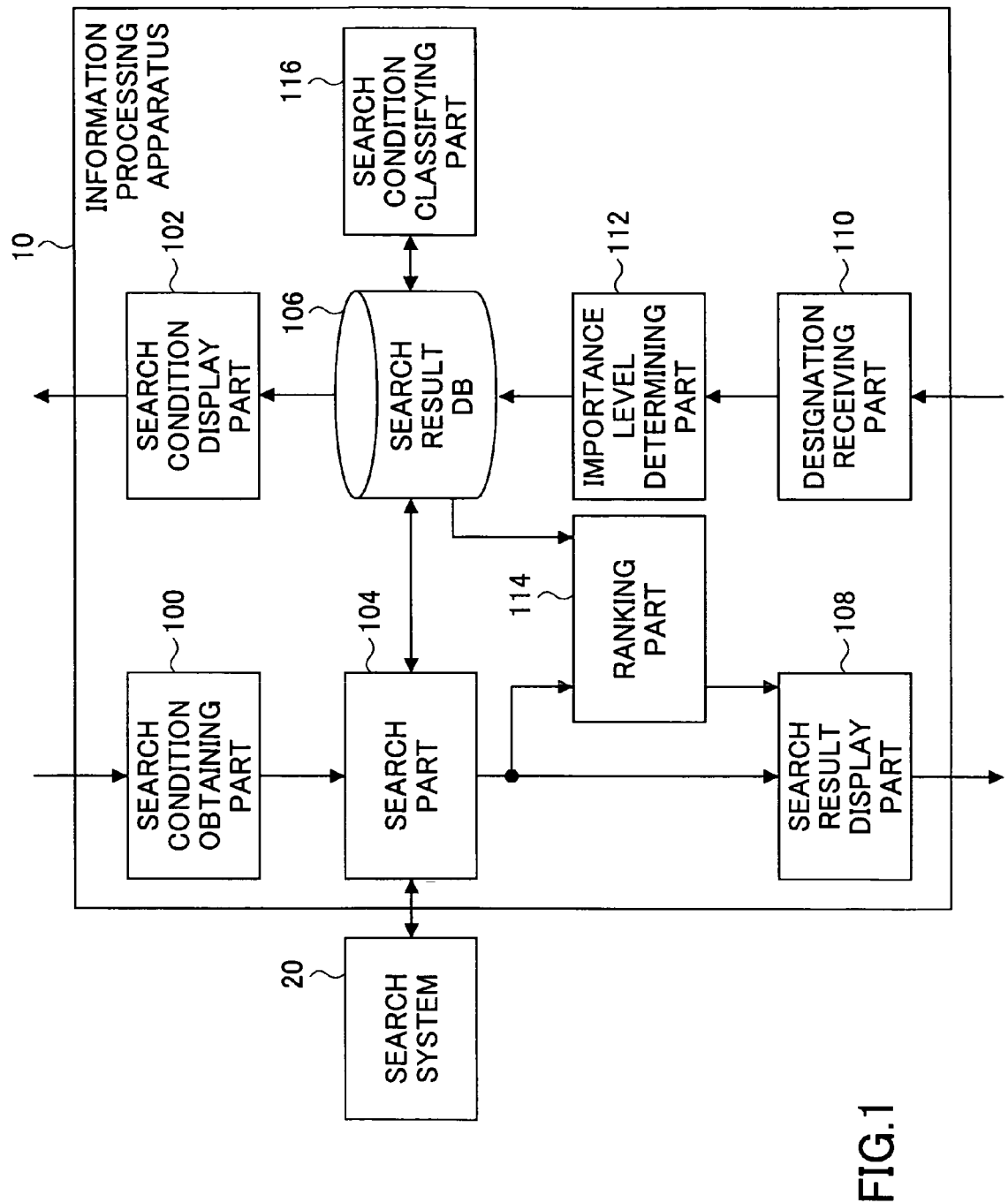
FIG. 1 shows a block diagram of a function configuration of an information processing apparatus.

Below, an information processing apparatus, an information processing method, a program and a computer readable information recording medium in embodiments of the present invention will be described. However, the invention is not limited to the embodiments FIG. 1 shows a block diagram of a function diagram of the information processing apparatus in an embodiment. The information processing apparatus 10 includes a search condition obtaining part 100, a search condition display part 102, a search part 104, a search result database (i.e., DB) 106, a search result display part 108, a designation receiving part 110, an importance level determining part 112, a ranking part 114 and a search condition classifying part 116.

The search condition obtaining part 100 obtains a search condition input by a user to the information processing apparatus 10. A document is in common given meta-information such as a writer's name, a created date, a title, a document type and so forth. Therefore, when a search target is a document, meta-information may be designated as a search condition. For example, a word such as "XX company" may be used as a search condition. It is also possible to designate a plurality of words such as "XX company & camera", as a search condition. Further, it is also possible to designate a natural sentence as a search condition. In this case, the search condition obtaining part 100 decomposes the thus-designated sentence into words with the use of a natural language process. As another example, when a relational database or such is searched, a numeric value may be designated as a search condition.

The search part 104 obtains a search condition through the search condition obtaining part 100, and provides a direction to a search system 20 to carry out search with the use of the thus-obtained search condition. The search system 20 is, for example, a Web search engine, which is connected with the information processing apparatus via a communication network. The search part 104 obtains a search result with respect to the above-mentioned search condition from the search system 20. Therefore, the search part 104 acts as a search result obtaining part. As another example, the search part 104 itself may carry out search.

The search result DB 106 stores a search condition which is used when the search part 104 provides a direction to the search system 20 to carry out search as mentioned above, and also, a search result thus obtained from the search system 20 with respect to the search condition, in association with the search condition. The search result display part 108 displays on a display screen (not shown) of the information processing apparatus 10 the search result obtained by the search part 104. When a plurality of search results have been obtained by the search part 104, the search result display part 108 displays a search result list on the display screen which includes information for identifying the respective search results, and also, corresponding abstracts of documents thus obtained as the search results. In a case of Web search, a list of URLs indicating locations in which the search results are stored may be displayed, as the search result list. It is noted that, in a case where the search results amount to a large quantity, the search result list is divided into a plurality of pages and the search result list may be displayed on the display screen, page by page.

The designation receiving part 110 receives a designation from user for the search result thus obtained by the search part 104. Further, when the search result list including the plurality of search results is divided into a plurality of pages as mentioned above, a direction from a user to designate a desired page thereof is received by the designation receiving part 110.

As a designation from a user, there may be a display designation to designate a specific page of the plurality of pages of the search result list to be displayed on the display screen, a selecting designation to designate a desired search result from the plurality of search results included in the search result list, and an importance designation to designate as an important result.

The importance level determining part 112 determines an importance level of each search result based on a user's designation received by the designation receiving part 110. In the embodiment, as importance levels, a total of four levels, i.e., an 'important' result, a 'display' result, a 'general' result, and a 'selection' result, having importance in the stated order, are provided. The importance levels will be described later. An importance level determined by the importance level determining part 112 is input to the search result DB 106 in association with a corresponding search result.

FIGS. 2A, 2B and 2C show data structures of the search result DB 106. The search result DB 106 includes three tables, i.e., a search condition table, a search result table and an importance level table. FIG. 2A shows a data structure of the search condition table. In the search condition table, search conditions and condition IDs for respective identifying the search conditions are stored in association with each other. The condition IDs are unique information in the search condition table.

FIG. 2B shows a data structure of the search result table. In the search result table, search results and result IDs for respectively identifying the search results are stored in association with each other. The result IDs are unique information in the search result table. It is noted that, in the example of FIG. 2B, document files (file 1, file 2, . . . , in FIG. 2B) obtained from search are stored as search result. However, in a case of Web search, URLs indicating locations storing document files may be stored instead of the document files themselves.

FIG. 2C shows a data structure of the importance level table. In the importance level table, the condition IDs, the importance levels and the result IDs are stored in association with each other. For example, it is assumed that 8 files represented by the result IDs '1' through '8' are obtained as search results from a search condition represented by a condition ID '1'. In this case, as shown in FIG. 2C, all the result IDs '1' through '8' are stored in association with the condition ID '1'.

There may be a case where the same search result may be further obtained from a different search condition. For example, from a search condition 'XX company' of a condition ID '1', a search result 'file 2' of a result ID '2' shown in FIG. 2B is obtained, and after that, the 'file 2' of the result ID '2' is again obtained from another search condition 'camera' of a condition ID '2'. In such a case, as shown in FIG. 2C, the result ID '2' is stored in association with both the condition ID '1' and the condition ID '2'.

Returning to FIG. 1, the search condition display part 102 displays on the display screen search conditions when the search conditions have been already stored in the search result DB 106. Therefore, the search condition display part 102 acts as a display control part. A user may select a desired search condition from the search conditions thus displayed on the display screen. The search condition obtaining part 100 obtains the search condition thus selected by the user, and inputs condition designating information for designating the search condition in the search part 104.

When obtaining the condition designating information from the search condition obtaining part 100, the search part 104 searches the search result DB 106, and obtains the same search condition as that designated by the condition designating information. Then, the search part 104 extracts a search result stored in association with the search condition from the search DB 106. Thus, the search part 104 obtains a search result stored in the search result DB 106 in association with a given search condition when the given search condition has been already stored in the search DB 106. On the other hand, when a given search condition has not been stored in the search DB 106, the search part 104 gives a direction to the search system 20 to carry out search from the given search condition.

The ranking part 114 shown in FIG. 1 ranks search results thus extracted from the search DB 106 according to importance levels which have been stored in the search result DB 106 in association with the respective search results. In this case, the search result display part 108 arranges the respective search results based on an order thus determined by the ranking part 114, and displays them on the display screen. Therefore, the search result display part 108 also functions as a display control part. It is noted that, for search results which have been newly obtained by the search system 20 according to a corresponding direction given by the search part 104, no importance levels have been stored in the search DB 106 yet. When the search result display part 108 displays such search results for which no importance levels have been stored yet, the search result display part 108 displays the search results on the display screen without ranking them.

Figure 3:
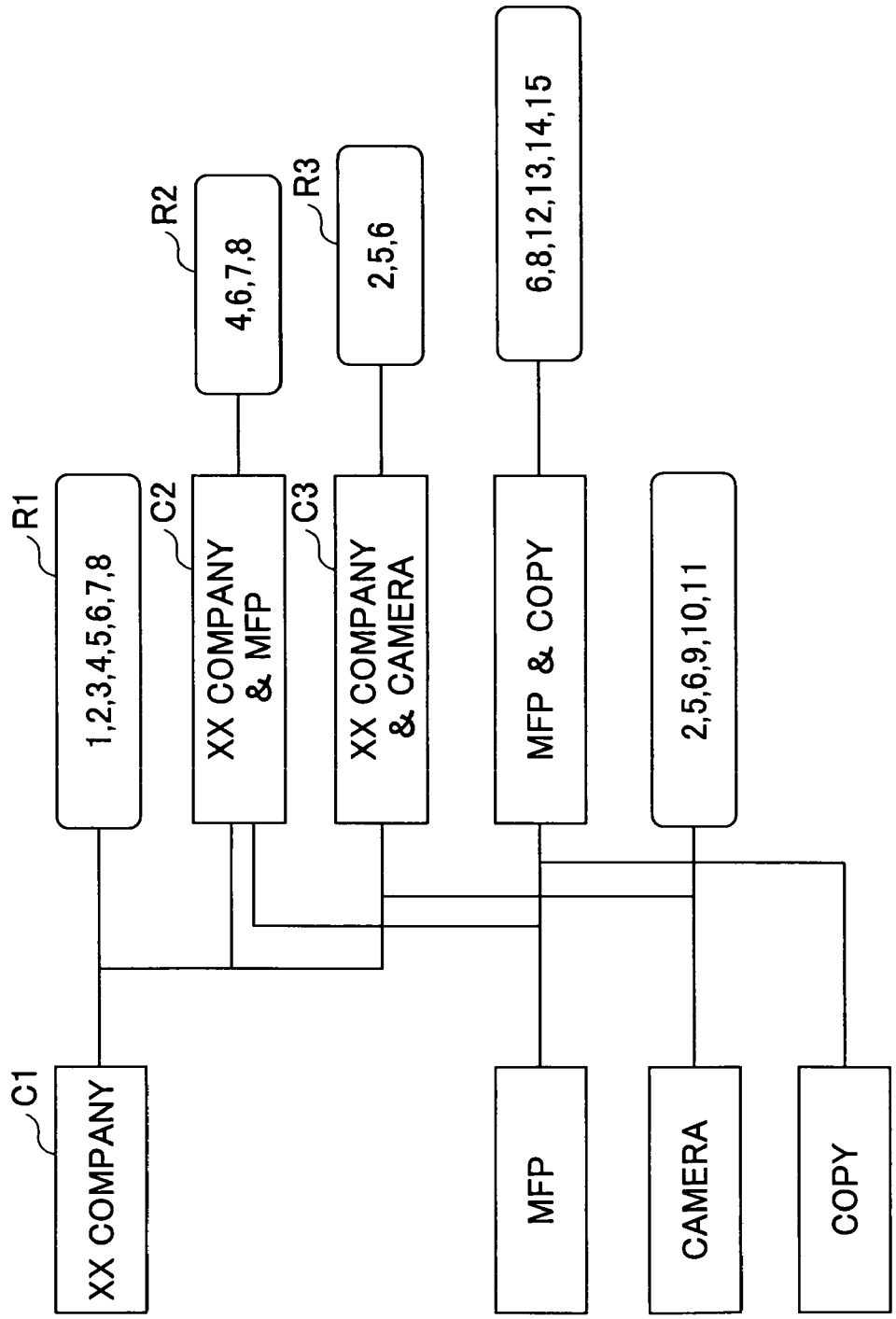
FIG. 3 illustrates classifying operation.

The search condition classifying part 116 classifies search conditions stored in the search DB 106 based on words included in the search conditions. FIG. 3 illustrates such classifying operation. For example, in the search conditions of the condition IDs '1' through '5' shown in FIG. 2A, words 'XX company' of a search condition 'XX company' of condition ID '1' are also included in other search conditions 'XX company & camera' (ID '3') and 'XX company & MFP' (ID '4'). Thus, respective search conditions may have inclusive relation. Then, according to such inclusive relation, the respective search conditions are classified by the search condition classifying part 116.

FIG. 3 shows a classifying result provided by the search condition classifying part 116 from the search conditions ID '1' through '5' shown in FIG. 2A. As shown in FIG. 3, with a search condition C1 'XX company', result IDs '1' through '8' are associated as search results R1 of the search condition C1. Further, in the search condition C1 'XX company', respective search conditions 'XX company & MFP' C2 and 'XX company & camera' C3 are included. With the search conditions 'XX company & MFP' C2 and 'XX company & camera' C3, search results R2, R3 of the respective search conditions, are associated.

Thus, when the search condition classifying part 116 thus classifies search conditions, a user can utilize a classifying result, and can easily carry out search with the use of the search conditions. Search conditions may be considered as keywords which most appropriately indicate document files obtained as corresponding search results. By managing the search results with the use of the search conditions as keys, the search results can be efficiently rearranged.

Figure 4:
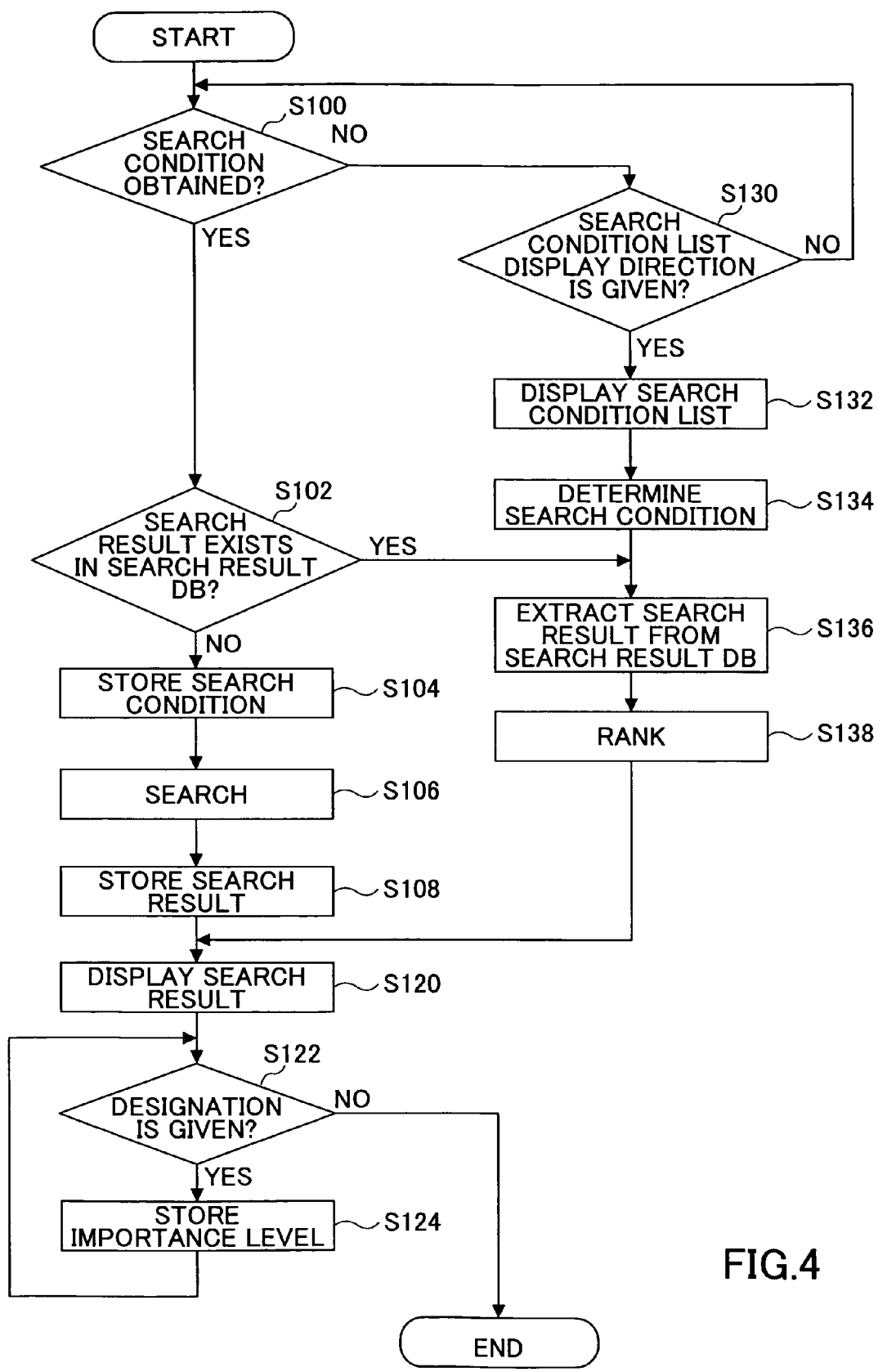
FIG. 4 shows a flowchart of information processing carried out by the information processing apparatus.

FIG. 4 shows an operation flowchart showing information processing carried out by the information processing apparatus 10. First, when the search condition obtaining part 100 obtains a search condition (YES of step S100), the search part 104 determines whether the same search condition is already stored in the search DB 106 (step S102). When the same search condition has not been stored in the each DB 106 (NO of step S102), the search part 104 stores the search condition in the search DB 106 (step S104). Next, the search part 104 uses the search condition, outputs a search direction to the search system 20, and thus, obtains corresponding search results from the search system 20 (step S106). Next, the search part 104 stores the search results in the search DB 106 (step S108). At this time, the search part 104 stores 'general' results, as importance levels of search results, which are thus newly obtained from the search system 20, in the search DB 106.

Next, the search result display part 108 displays the search results thus obtained on the display screen (step S120). Next, when the designation receiving part 110 receives input for designating importance levels from a user (YES of step S122), the importance level determining part 112 stores the importance levels in the search DB 106 in association with the corresponding search results (step S124).

Figure 5:
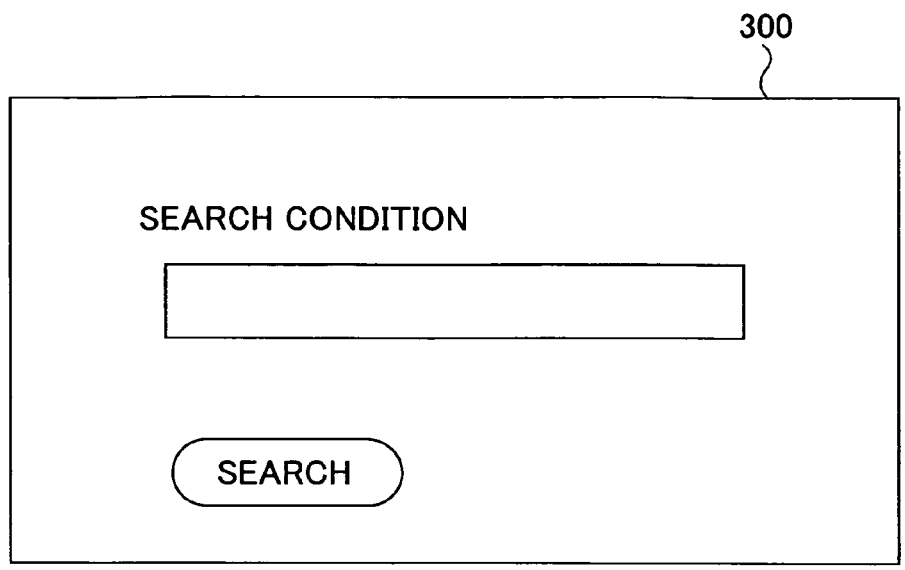
FIG. 5 shows a search condition input page.

FIG. 5 shows a search condition input page 300. A user inputs a keyword or such in a field of 'search condition' in the search condition input page 300. Then, when the user carries out operation to select a search button, the search condition obtaining part 100 obtains a search condition thus input by the user, and the search part 104 carries out search from the search condition.

Figure 6:
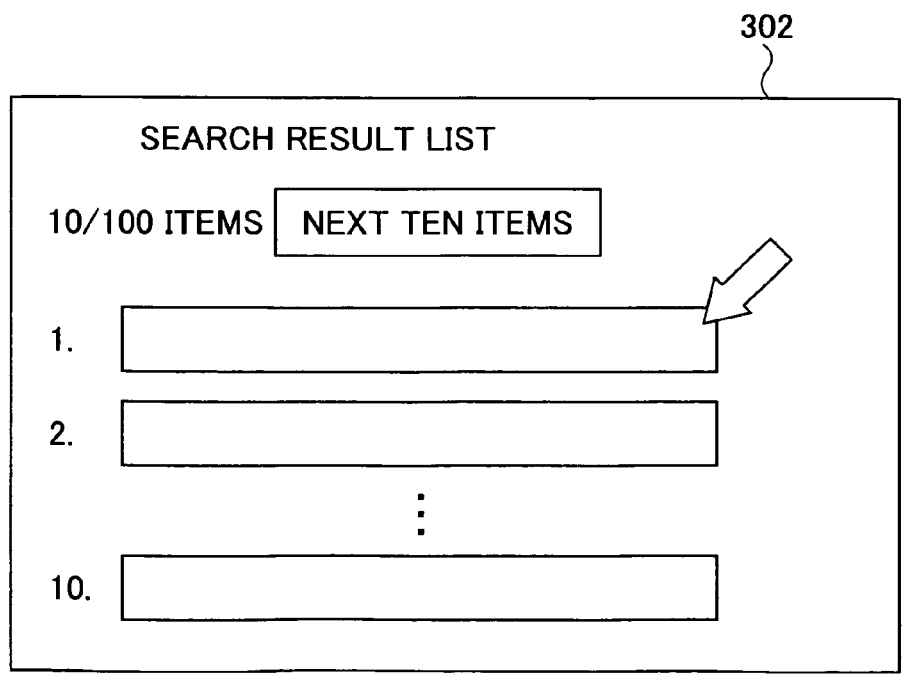
FIG. 6 shows a search result list page.

FIG. 6 shows a 'search result list' page 302. In an example of FIG. 6, as search results, 100 items of document files have been obtained, and ten items therefrom are displayed on the display screen. Thus, when the number of items of search results is large, the search results are divided into a plurality of pages, and are displayed page by page on the display screen. It is noted that, in the 'search result list' page 302, as search results, titles, abstracts thereof, parts thereof or such of respective document, are displayed.

When search results are thus actually displayed on the display screen as shown in FIG. 6, the importance determining part 112 changes importance levels of the search results thus displayed from 'general' results into 'display' results. That is, a change is made to higher importance levels. Further, when a user carries out operation on the 'search result list' page 302 to select a 'next ten items' button, the next ten items are then displayed.

At this time, the designation receiving part 110 receives this operation of the user to select the 'next ten items' button as a display direction for further ten search results to be displayed next. Then, the importance determining part 112 changes importance levels of the search results concerning the display direction from 'general' results into 'display' results. Search results thus displayed on the display can be presumed as having been read by a user. This is the reason why importance levels higher than those of search results which have not been displayed yet are thus set to search results which have been already displayed.

When the user wishes to read detailed contents of a thus-displayed search result in the 'search result list' page 302, the user should carry out operation to select the desired search result from the ten items of search results currently displayed. In response to this operation, the search result display part 108 displays the contents of a corresponding document file on the display screen. Thus, when the user thus carries out operation to select the document file as the desired search result, the designation receiving part 110 receives this operation as a selecting direction. The selecting direction is notified of to the importance level determining part 112, which then changes an importance level of the search result concerning the selecting direction from a 'display' result into a 'selection' result.

Figure 7:
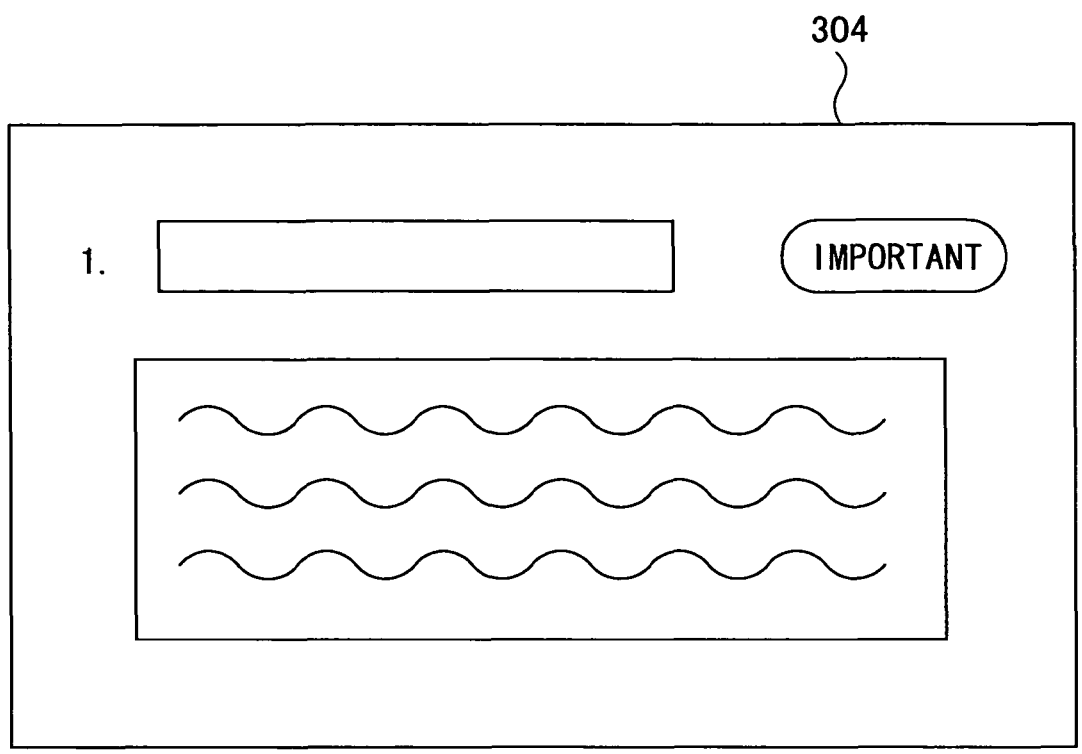
FIG. 7 shows a document file page for displaying a selected document file.

FIG. 7 shows a document file page 304 displaying the contents of the thus-selected document file. In this document file page 304, an 'important' button is displayed together with the contents of the document file as shown in FIG. 7. The user may carry out operation to select the 'important' button, and as a result, an importance level of the document file can be set higher. When the user thus carries out operation to select the 'important' button, the designation receiving part 110 receives it as a designation that the thus-selected search result is important, and notifies of information concerning this designation to the importance level determining part 112. The importance level determining part 112 receives this notification of the designating information, and changes an importance level of the search result from a 'selection' result into an 'importance' result.

It is noted that, in the embodiment, as mentioned above, a 'selection' result is lower than a 'display' result in their importance. This is because, a search result which has been selected but has not been determined as being important may by a user may have the contents in which the user takes a less interest, with a high possibility. It is noted that, the setting of importance levels is not limited to the embodiment, and the setting of importance levels may be determined freely.

Thus, in the information processing apparatus 10 in the embodiment, after search, in steps S122, S124, an importance level of each search result can be determined according to a designation by a user who has read a search result list.

Further, instead of the input page 300 shown in FIG. 5, a list of search conditions already stored in the search DB 106 may be displayed in response to input of a user's direction. In this case, the user can select a desired search condition from the thus-displayed search condition list.

When a direction to display a search condition list is input by a user (NO of step S100, YES of step S130 of FIG. 4), the search condition display part 102 displays a list of search conditions stored in the search result DB 106 on the display screen (step S132).

Figure 8:
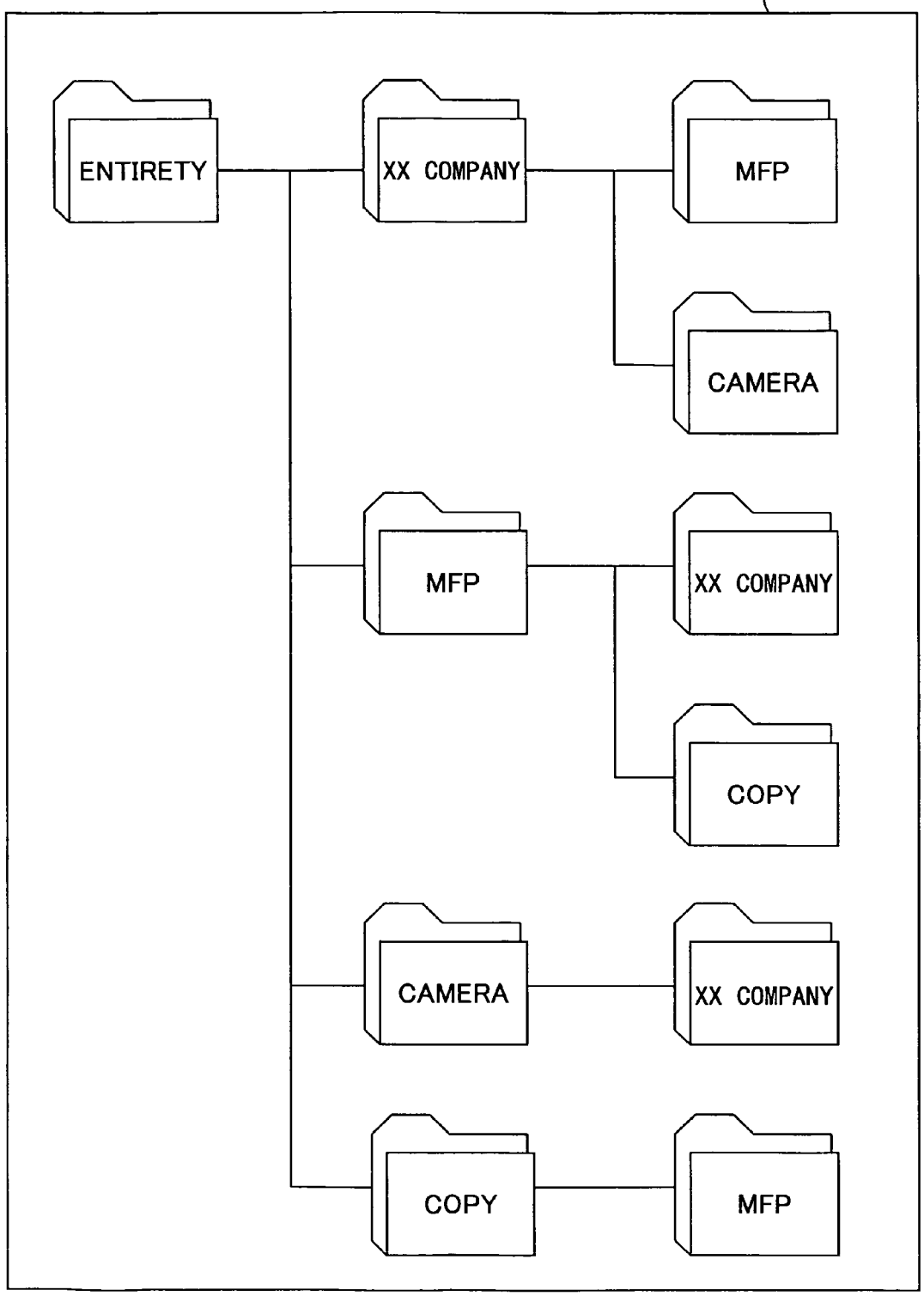
FIG. 8 shows a search condition list page.

FIG. 8 shows an example of a search condition list page 310. As shown in FIG. 8, search conditions 'entirety', 'XX company', 'MFP', 'camera', . . . , are displayed in a manner of having a folder structure corresponding to a classifying result provided by the search condition classifying part 116. By adopting such a manner of displaying, a user can easily determine a desired search condition by reading the search condition list page 310 thus displayed.

Then, when the user carried out operation to select a desired search condition from the thus-displayed search condition list page 310, the search condition obtaining part 100 obtains the search condition thus selected by the user (step S134 of FIG. 4). Next, the search part 104 extracts search results stored in the search DB 106 in association with the search condition thus obtained by the search condition obtaining part 100 (step S136). Next, the ranking part 114 carries out ranking of the search results thus extracted by the search part 104. Specifically, the ranking part 114 ranks the extracted search results in such a manner that a search result having a higher importance level is ranked higher (step S138).

Next, the search result display part 108 displays a search result list (step S120) in which the search results are arranged in an order obtained from ranking carried out by the ranking part 114 in step S138. Arranging the search results in the order obtained from ranking carried out by the ranking part 114 corresponds to modifying the search results according to their importance levels. For example, when the user carries out operation to select a folder of a search condition 'XX company' and then select a folder of a search condition 'MFP' shown in FIG. 8 as a search condition, a list of search results stored in the search result DB 106 in association with a search condition 'XX company & MFP' including both words of the above-mentioned search conditions 'XX company' and 'MFP' is displayed in an order of their importance levels. In this example, the search condition 'XX company & MFP' (as a third search condition) includes both the search conditions 'XX company' and 'MFP' (as first and second search conditions), and in this case, the search conditions 'XX company' and 'MFP' (the first and second search conditions) are input by the user, and thereby the search condition 'XX company & MFP'(the third search condition) is designated. It is noted that, the importance levels of the respective search results may be changed according to a designation from the user while the search result list is thus displayed (steps S122, S124).

Further, when a search condition is input by a user (YES of step S100), and the same search condition has been already stored in the search DB 106 (NO of step S102), step S136 is carried out. In step S136, the search part 104 extracts search results stored in the search DB 106 in association with this search condition.

Figure 9:
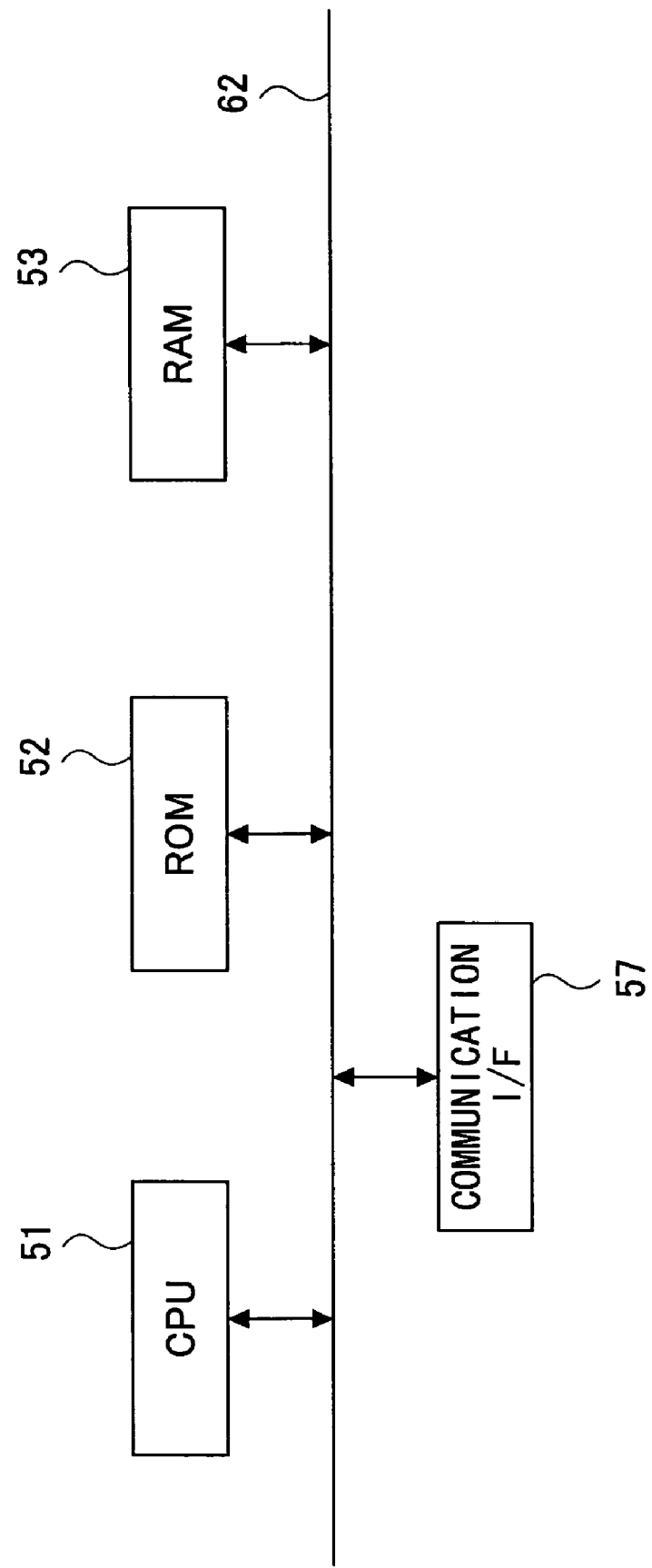
FIG. 9 shows a hardware configuration of the information processing apparatus.

FIG. 9 shows a hardware configuration of the information processing apparatus 10 in the embodiment. As shown in FIG. 9, the information processing apparatus 10 includes a ROM 52 storing a program for carrying out the information processing of the information processing apparatus 10, a CPU 51 controlling respective parts of the information processing apparatus 10 according to the program stored in the ROM 52, a RAM 53 storing various data necessary to control the information processing apparatus 10, a communication I/F (interface) 57 for carrying out communication externally via a communication network and a bus 62 connecting the respective parts.

The above-mentioned program is read by the CPU 51 from the ROM 52, is then loaded in a main storage (the RAM 53, or such), and then, is executed by the CPU 51. As a result, the functions of the respective parts shown in FIG. 1 described above as the function configuration are performed.

It is noted that the program for carrying out the information processing of the information processing apparatus 10 may be provided in the form of an installable or executable file which is stored in a computer readable information recording medium such as a CD-ROM, a flexible disk (FD), a DVD, or such.

In this case, the program is read by the CPU 51 from the computer readable information recording medium, is then loaded in the main storage, and then, is executed by the CPU 51. As a result, the functions of the respective parts shown in FIG. 1 described above as the function configuration are performed.

Further, the program for carrying out the information processing of the information processing apparatus 10 may be stored in a computer which is connected to a communication network such as the Internet, and then, may be provided as a result of being downloaded therefrom via the communication network.

Various changes or improvements may be carried out on the above-mentioned embodiment.

For example, as a first variant embodiment of the above-mentioned embodiment, as a method of determining the above-mentioned importance levels, an alternative method may be used. That is, instead of the above-mentioned four importance levels in the above-mentioned embodiment, three importance levels are used, i.e., the above-mentioned 'important'result, 'general' result and 'selection' result. That is, in the first variant embodiment, when a list of search results is displayed, importance levels of the search results should not be changed. That is, when the list of search results is displayed, importance levels of the search results are kept as 'general' results unchanged. Then, when a user selects one of the plurality of search results thus displayed in the list, that is, when the designation receiving part 110 receives a corresponding selecting designation from the user, the importance level determining part 112 changes an importance level of the thus-selected search result into a 'selection'result. Then, when the user selects the 'important'button, that is, when the designation receiving part 110 receives a corresponding designation that the selected search results is important, the importance level determining part 112 changes the importance level of the search result into an 'important' result. Thus, a specific method to determine an important level of a search result is not limited to that of the above-mentioned embodiment.

As a second variant embodiment, when a search condition is input by a user or when a predetermined search condition is designated by a user, even when search results from the same search condition have been already stored in the search result DB 106, the search part 104 may again requests the search system 20 to carry out search, and obtain search results. In the second variant embodiment, the search result display part 108 displays a list of the thus-obtained search results on the display screen.

At this time, as importance levels of the thus-obtained search results, importance levels which have been already stored in the search result DB 106 in association with the search results previously obtained from the same search condition are used, the ranking part 114 carries out ranking and the search result display part 108 displays the search results in an order obtained from the ranking. In the second variant embodiment, for a case where a long time has elapsed from previous search, and thus, the search results previously obtained from the same search condition may thus have changed, the new search results from the same search condition can be provided to a user. Further, even when the new search results obtained from the same search condition are displayed, the importance levels of the previous search results can be used as mentioned above. Therefore, it is possible to automatically place a search result having a higher importance level at a higher position when the search results are thus displayed.

Figure 10:
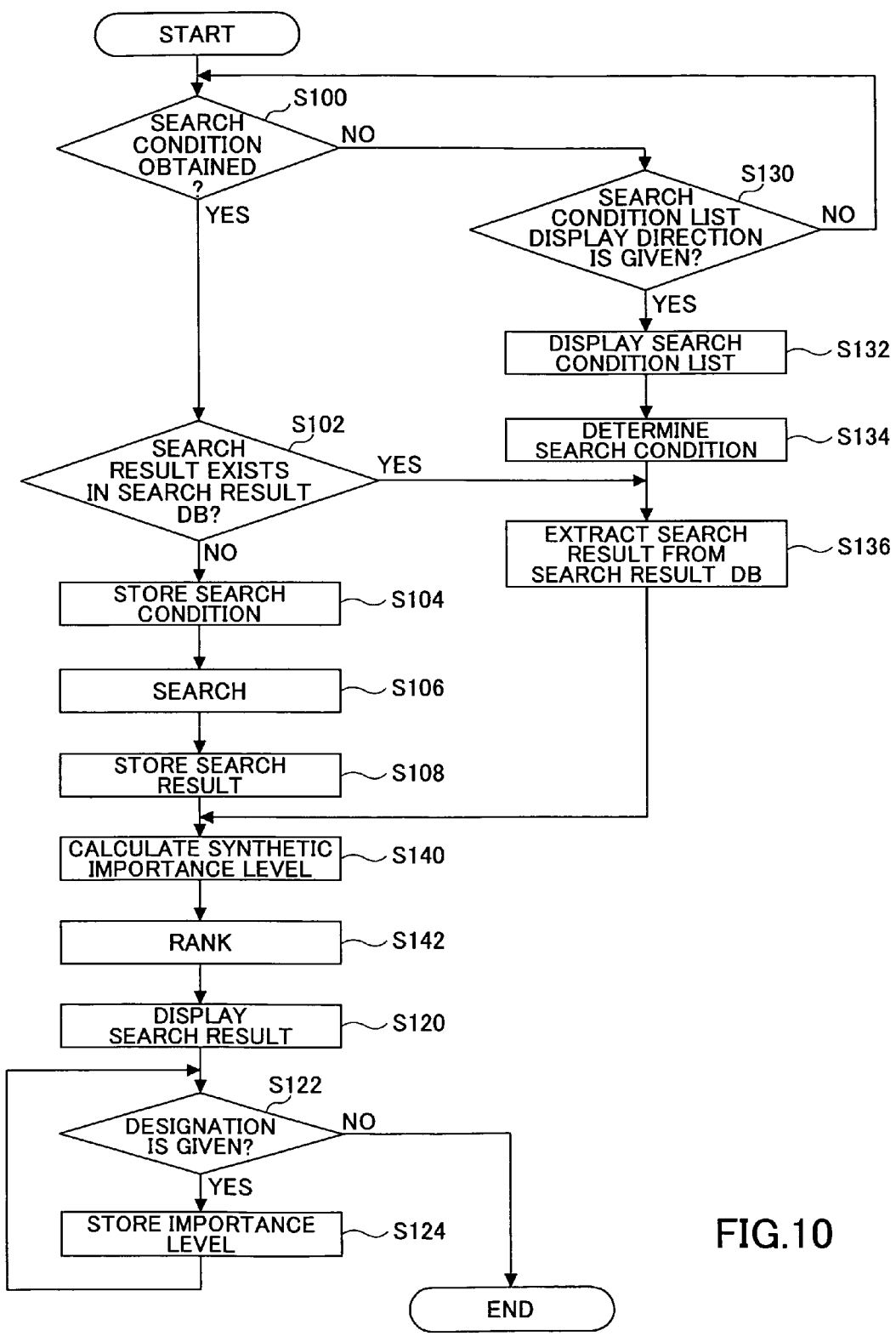
FIG. 10 shows a flow chart of information processing concerning a third variant embodiment.

FIG. 10 illustrates a third variant embodiment. An operation flowchart shown in FIG. 10 has a configuration approximately the same as that of FIG. 4 described above. Thus, the same reference numerals are given to the same steps, and duplicate description will be omitted. In the third variant embodiment, it is assumed that the search part 104 carries out search from a search condition which has not been stored in the search result DB 106 (step S106 of FIG. 10). In this case, then, after a search result thereof is stored in the search result DB 106 (step S108), the ranking part 114 calculates a synthetic importance level (step S140).

For example, it is assumed that respective search results and importance levels for search conditions of condition IDs '1' through '5' shown in FIG. 2C have been already stored. At this time, it is assumed that, from a new search condition of a condition ID '6' for example, a search result 'file 2' has been obtained. In this case, the ranking part 114 extracts all importance levels corresponding to the same 'file 2', having a result ID '2', already stored in the search result DB 106. In the example of FIG. 2C, the above-mentioned results ID '2' have been already stored in association with the respective condition IDs '1' through '3'. In such a case, the ranking part 114 determines a synthetic importance level for the search result newly obtained from the search condition of condition ID '6' as mentioned above, based on importance levels already stored in the search result DB 106 in association with the above-mentioned results IDs '2', already stored in the search result DB 106 respectively in association with the condition IDs '1' through '3' as mentioned above.

For example, '+3', '+1', '0' and '−1' are given, as values corresponding to the respective importance levels, i.e., 'important' result, 'display' result, 'general' result and 'selection'result, respectively. Then, the ranking part 114 sums up values thus given to respective importance levels, to obtain the synthetic importance level. In the above-mentioned example of FIG. 2C, importance levels stored in the search result DB 106 in association with the above-mentioned three result IDs '2' are all 'important' results. The value '+3' is given to the 'important' result as mentioned above. Therefore, in this case, the ranking part 114 sums up the values '+3' of the three result IDs '2'. That is, 3+3+3=9. Thus, the ranking part 114 obtains the synthetic importance level of '+9'.

Thus, the ranking part 114 calculates synthetic importance levels for each of all the search results obtained by the search part 104 from a new search condition which has not been stored in the search result DB 106 yet (step S108), and ranks the search results in a descending order of thus-obtained synthetic importance levels (step S142). The search result display part 108 displays the search results in an order obtained from the ranking according to the synthetic importance levels (step S120). Thus, in the third variant embodiment, when an importance level for a search result (in the above-mentioned example, the result ID '2') obtained from a new search condition (in the above-mentioned example, the condition ID '6') has not been stored in the search result DB 106, a synthetic importance level is obtained based on importance levels (in the above-mentioned example, all 'important' results), which have been already stored in the search result DB 106, for the same search results (in the above-mentioned example, the three result IDs '2') already obtained from other search conditions (in the above-mentioned example, the condition IDs '1' through '3'). The thus-obtained synthetic importance levels are used to rank thus-obtained search results from the new search condition.

A search result, for which high importance levels have been determined for a plurality of search conditions, may be effective information for a user, with a high possibility. For example, in the above-mentioned example, the search result of the result ID '2' has been obtained from each of the three search conditions of the condition IDs '1' through '3', and also, the respective importance levels are all 'important' results as mentioned above. In such a case, the search result of the result ID '2' may be effective information for a user with a high possibility. Therefore, such information is ranked higher when search results are displayed in a list in the third variant embodiment. Thereby, it is possible to provide search result in an effective manner.

Further, as this third variant embodiment, the information processing apparatus 10 may be a server which is connected with a plurality of personal computers possessed by respective users. In this case, the information processing apparatus 10 manages search conditions input from the respective users via the personal computers and impotence levels designated by the respective users via the personal computers, in the lump. Thereby, search results can be provided in a manner suitable to a group to which the plurality of users belong.

The present invention is not limited to the specifically disclosed embodiments, and variations and modifications may be made without departing from the scope of the present invention.

The present application is based on Japanese priority applications Nos. 2007-182990 and 2008-172811 filed Jul. 12, 2007 and Jul. 1, 2008, respectively, the entire contents of which are hereby incorporated herein by reference.

What is claimed is:

1. An information processing apparatus using a storing unit configured to store importance levels of contents and one or more processors to control parts of the information processing apparatus, the information processing apparatus comprising:

an input part configured to input a search condition;

an obtaining part configured to obtain a search result for contents based on the search condition inputted by the input part;

a display control part configured to display a part of contents associated with the search result based on an importance level of the contents or display detail of the contents associated with the search result based on a user selection;

a receiving part configured to selectively receive a request of the importance level of the contents of which the detail of the contents is displayed by the display control part;

a setting part configured to set the importance level of the contents corresponding to the request received by the receiving part; and an importance determining part configured to determine the importance level of the contents displayed by the display control part depending on whether the part of contents is displayed or the detail of the contents are displayed and the request of the importance level of the contents of which the detail of the contents is displayed is not received, the importance determining part is configured to determine the importance level as the importance level of the contents of which the part is displayed, setting importance level of the contents of which the part is displayed higher than an importance level of the contents of which the detail is displayed and the request of the importance level of the contents of which the detail of the contents is displayed is not received.

2. The information processing apparatus as claimed in claim 1, further comprising:
a synthetic importance determining part configured to determine the importance level of the contents obtained by the obtaining part based on the importance level of search results of contents stored by the storing unit, wherein
the storing unit is configured to store the importance level of search results of contents associated with the search condition,
the input unit is configured to input the search condition which is not stored by the storing unit, and
the synthetic importance determining part is configured to determine the importance level of the contents obtained by the obtaining part based on the importance level of search results of contents stored by the storing unit when the importance level of the contents obtained by the obtaining part is stored by the storing unit.

3. An information processing method executed by one or more processors, using a storing unit configured to store importance levels of contents, comprising the steps of:
inputting, by an input part, a search condition;
obtaining, by an obtaining part, a search result for contents based on the search condition inputted by the input part;
displaying, by a display control part, a part of contents associated with the search result based on an importance level of the contents or display detail of the contents associated with the search result based on a user selection;
selectively receiving, by a receiving part, a request of the importance level of the contents of which the detail is displayed by the display control part;
setting, by a setting part, the importance level of the contents corresponding to the request received by the receiving part; and
first determining, by an importance determining part, the importance level of the contents displayed by the display control part depending on whether the part of the contents is displayed or the detail of the contents are displayed and the request of the importance level of the contents of which the detail of the contents is displayed is not received,
the first determining step determines the importance level as the importance level of the contents of which the part is displayed, setting importance level of the contents of which the part is displayed higher than an importance level of the contents of which the detail is displayed and the request of the importance level of the contents of which the detail of the contents is displayed is not received.

4. The information processing method as claimed in claim 3, further comprising:
second determining, by a synthetic importance determining part, the importance level of the contents obtained by the obtaining part based on the importance level of search results of contents stored by the storing unit, wherein the storing unit is configured to store the importance level of search results of contents associated with the search condition,
wherein the inputting step inputs the search condition which is not stored by the storing unit,
wherein the second determining step deteimines the importance level of the contents obtained by the obtaining part based on the importance level of search results of contents stored by the storing unit when the importance level of the contents obtained by the obtaining part is stored by the storing unit.

5. A computer readable information recording medium storing a program which, when executed by one or more processors, controlling an information processing apparatus using a storing unit configured to store importance levels of contents, carries out the steps of:
inputting, by an input part, a search condition;
obtaining, by an obtaining part, a search result for contents based on the search condition inputted by the input part;
displaying, by a display control part, a part of contents associated with the search result based on an importance level of the contents or display detail of the contents associated with the search result based on a user selection;
selectively receiving, by a receiving part, a request of the importance level of the contents of which the detail of the contents is displayed by the display control part;
setting, by a setting part, the importance level of the contents corresponding to the request received by the receiving part; and
first determining, by an importance determining part, the importance level of the contents displayed by the display control part depending on whether the part of contents is displayed or the detail of the contents are displayed and the request of the importance level of the contents of which the detail of the contents is displayed is not received,
the first determining step determines the importance level as the importance level of the contents of which the part is displayed, setting importance level of the contents of which the part is displayed higher than an importance level of the contents of which the detail is displayed and the request of the importance level of the contents of which the detail of the contents is displayed is not received.

6. The computer readable information recording medium as claimed in claim 5, further comprising:
second determining, by a synthetic importance determining part, the importance level of the contents obtained by the obtaining part based on the importance level of search results of contents stored by the storing unit, wherein the storing unit is configured to store the importance level of search results of contents associated with the search condition,
wherein the inputting step inputs the search condition which is not stored by the storing unit,
wherein the second determining step determines the importance level of the contents obtained by the obtaining part based on the importance level of search results of contents stored by the storing unit when the importance level of the contents obtained by the obtaining part is stored by the storing unit.

* * * * *